United States Patent [19]

Christou

[11] 4,131,899

[45] Dec. 26, 1978

[54] DROPLET GENERATOR FOR AN INK JET PRINTER

[75] Inventor: Kyriakos Christou, Livonia, Mich.

[73] Assignee: Burroughs Corporation, Detroit, Mich.

[21] Appl. No.: 770,851

[22] Filed: Feb. 22, 1977

[51] Int. Cl.[2] .................... G01D 15/18

[52] U.S. Cl. .................... 346/140 R

[58] Field of Search .................... 346/140 R; 58/91

[56] References Cited

U.S. PATENT DOCUMENTS

| | | | |
|---|---|---|---|
| 3,205,712 | 9/1965 | Hoff, JR. | 58/91 X |
| 3,747,120 | 7/1973 | Stemme | 346/140 R X |
| 3,852,773 | 12/1974 | Sicking et al. | 346/140 R |
| 3,930,260 | 12/1975 | Sicking | 346/140 R |
| 4,024,544 | 5/1977 | Vernon | 346/140 R X |
| 4,032,928 | 6/1977 | White et al. | 346/140 R |
| 4,045,801 | 8/1977 | Iwasaki | 346/140 R |

FOREIGN PATENT DOCUMENTS

| | | | |
|---|---|---|---|
| 2532037 | 1/1976 | Fed. Rep. of Germany | 346/140 R |

OTHER PUBLICATIONS

Lee, H. C. et al., High-Speed Droplet Generator, IBM Tech. Disclosure Bulletin, vol. 15, No. 3, Aug. 1972, p. 909.

*Primary Examiner*—George H. Miller, Jr.
*Attorney, Agent, or Firm*—Charles P. Sammut; Robert C. J. Tuttle; Carl Fissell, Jr.

[57] ABSTRACT

An ink jet printer having a piezoelectric capillary injector-type droplet generator. The droplet generator includes an integral body having formed within it a single chamber that receives and holds ink under capillary action. A nozzle defined by one or more continuous apertures is formed in the body in communication with the chamber. A piezoelectric crystal actuates a flexural diaphragm that forms one wall of the chamber. The flexing of the diaphragm creates pressure perturbations that force the flow of ink through the nozzle for droplet generation. Also provided are means for damping oscillations of the piezoelectric crystal to prevent unwanted secondary generation of droplets.

13 Claims, 8 Drawing Figures

DROPLET GENERATOR FOR AN INK JET PRINTER

INTRODUCTION

This invention relates to, ink jet droplet printers and more particularly to printers using a piezoelectric capillary injector for droplet formation.

BACKGROUND OF THE INVENTION

Ink jet printers are gaining wide acceptability as advances in technology make their use more practical and economical. The printers can operate at extremely high speeds and do not require mechanical displacement to enter information onto a record medium.

In general, an ink jet printer operates by issuing a stream of ink droplets from the nozzle of a droplet generator; the droplets may be issued periodically or aperiodically depending on the particular application. In aperiodic applications, the printer may have a print head made up of an ordered array or matrix of nozzles. Alphanumeric and other type characters can be formed by activating a selected pattern of nozzles to represent a character.

The droplet generator is a fundamental component in an ink jet printer. It must reliably issue an ink droplet of uniform measure at a precise velocity despite variations in ink temperature and viscosity. One form of droplet generator is the piezoelectric capillary injector. Basically, this generator comprises a body having formed within it a cell or chamber filled with ink. The ink chamber is fed by capillary action through a port in the body. One wall of the cell is closed by a diaphragm. Opposite the diaphragm is an aperture that serves as a nozzle. The diaphragm is bonded to an axially polarized piezoelectric crystal which experiences axial expansion and radial contraction when electrically stimulated. The motion of the crystal causes the diaphragm to flex. This creates a pressure perturbation in the ink chamber forcing an ink droplet to be issued from the nozzle.

The basic development of the piezoelectric capillary injector is discussed in "The Piezoelectric Capillary Injector — A New Hydrodynamic Method For Dot Pattern Generation", by Erik Stemme and Stig-Goran Larson, IEEE Transactions on Electron Devices, January 1973, pp 14–19. The experimental model disclosed therein is basic to the art, but is found upon study to have two major drawbacks which are discussed as follows.

First, the Stemme-Stig Goran device is difficult to manufacture due to the complexity of its design. It has a central, inner liquid cell formed between the front and rear faces of the body; a thin internal liquid layer formed parallel and proximate to the front face of the body that supports ink under capillary forces; a first aperture connecting the inner liquid cell and the liquid layer; and a second aperture that connects the liquid layer and the outside and serves as a nozzle. The device requires that the first and second apertures be coaxially aligned, although the apertures are each only 40 $\mu m$ in diameter and are formed in adjunct body members. This is an extremely difficult criterion to meet in production models.

Secondly, the Stemme-Stig Goran device discloses no means to damp oscillatory excursions of the piezoelectric crystal. These undesirable oscillations can cause secondary issuance of droplets. Moreover, crystal oscillation limits printing speed by requiring that the excursions settle down before another print signal is applied to the crystal.

These limitations of the prior art have been an inducement for the design of an ink droplet generator that is of reduced complexity but of improved performance capability. The present invention addresses this objective.

BRIEF SUMMARY OF THE INVENTION

An objective of the present invention is a piezoelectric capillary injector of a simplified, yet improved design that is readily manufacturable, but does not require a tradeoff on performance. Basically, this is achieved through the design of a droplet generator comprising an integral body having formed within it a single ink bearing chamber that communicates with a nozzle defined by one or more parallel apertures, each aperture being uninterrupted along its axial dimension. The single ink bearing chamber is formed as a uniformly recessed surface in the rear face of the integral body. Positioned immediately adjacent the ink bearing chamber and in closed relation with respect thereto is a flexural diaphragm which is actuated by a piezoelectric crystal. The excursions of the diaphragm are directly communicated as pressure perturbations to the ink chamber. These perturbations cause an outward flow of ink through the nozzle for droplet formation. The integral body design adapts to easy manufacture and the single ink chamber and uninterrupted nozzle apertures provide simplified hydrodynamic operation.

A further objective of the present invention is the provision of means to damp out oscillatory flexing of the piezoelectric crystal after the application of electrical excitation. This is generally accomplished by the provision of an energy-dissipative boundary adjacent the rear of the piezoelectric crystal to absorb and dissipate the kinetic energy from the return excursions of the crystal. In the preferred embodiment, the energy-dissipative surface is formed of silicon and supported within the housing that contains the droplet generator body.

The present invention will be better appreciated and more fully understood by reference to the following detailed description of a specific embodiment which is to be taken in conjunction with the drawing.

DETAILED DESCRIPTION OF A SPECIFIC EMBODIMENT

Figure 1:
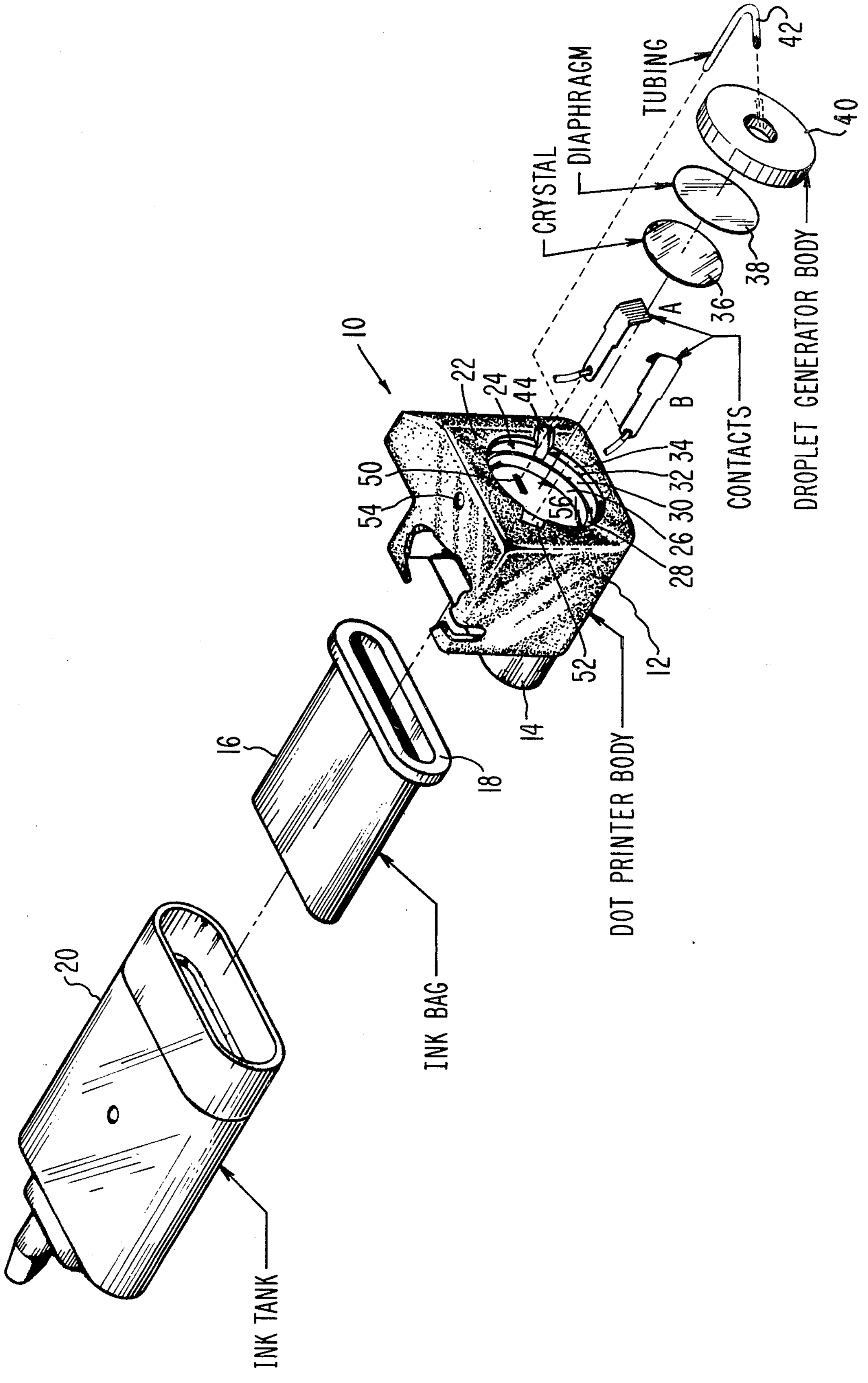
FIG. 1 is an exploded isometric view of an ink jet printer of the type adaptable for use with the present invention.

An ink jet dot printer incorporating the present invention is shown generally at 10 in FIG. 1. The dot printer 10 is presented in an exploded isometric view to illustrate each component separately, yet show its relationship with other components.

The dot printer 10 may be used singularly or as an element in an ordered array or matrix. In the former case an especially advantageous use is for the marking of a rejected MICR or OCR character in a document reading apparatus, as is disclosed in U.S. Ser. No. 573,787, filed by William B. Templeton on May 1, 1975 and assigned to the assignee of the present invention now U.S. Pat. No. 4,068,212. In the latter case, the elements making up the matrix may be selectively energized to form alphanumeric characters.

The ink jet dot printer 10 comprises a dot printer body 12 formed of molded plastic or similar type material which is durable but easily formed. The dot printer body 12 has a flange 14 formed on the lower portion of its rear face. The flange 14 couples with an ink bag 16 that has a mating flange 18 at its mouth. The ink bag is disposed within an ink tank 20 that overfits the flange 14.

The dot printer body 12 has formed in its front face 22 a central opening 24. The central opening is configured in three successive segments to receive and seat the components that cooperate for droplet generation. Specifically, the central opening 24 comprises a first, innermost radial space 26. A second, mediate radial space 30 is divided from the first radial space 26 by a radial step 28. A third, outermost radial space 34 is divided from the second radial space 30 by a second step 32.

The first radial space 26 receives and seats a piezoelectric crystal 36 in the shape of a thin cylindrical wafer. The second radial space 30 receives and seats a thin disk or diaphragm 38 of slightly larger radial dimension than the crystal 36. The third radial space 34 receives and seats a substantially cylindrical droplet generator body 40. The crystal 36, diaphragm 38, and droplet generator body 40 will each hereinafter be described in greater detail.

A segment of tubing 42 bent into an L-shape has one end receivable into the droplet generator body 40 and another end receivable into a complementary-shaped aperture 44 in the front face 22 of the dot printer body 12. The tubing 42 communicates the droplet generator body 40 with the ink bag 16 to provide means for supplying ink to the generator body.

A pair of contacts A and B provide means for electrically exciting the crystal 36, diaphragm 38, and droplet generator body 40. Terminal A has a tab-like end receivable into a slot 50 in the central opening of the dot printer body 12. The other end of contact A abuts the back face of crystal 36 at its center. Contact B has one tab-like end insertable into a slot 52 in the front face 22 of dot printer body 12. The other end of contact B abuts the side wall of the droplet generator body 40. An electrically conductive path can be defined from contact A; through the crystal 36; through the diaphragm 38, through the droplet generator body 40; to contact B. Electrical stimulation will induce the formation and issuance of an ink droplet in the manner to be hereinafter discussed.

The dot printer body 12 has a port 54 formed through its top surface. When the ink jet dot printer 10 is in assembled relation, the interstices between the rear face of the crystal 36 and the interior face 56 of the central opening 24 are filled by the injection of a resilient, damping material through the port 54. In the preferred embodiment, the resilient, damping material is silicon and may specifically be room temperature vulcanizing silicon as can be commercially obtained from General Electric Company and identified as RTV-102. The introduction of a resilient, damping material within the interstices will prevent secondary droplet generation from a single electrical excitation by damping secondary oscillations or flexing of the crystal 36, as will become apparent in the discussion to follow.

Figure 2A:
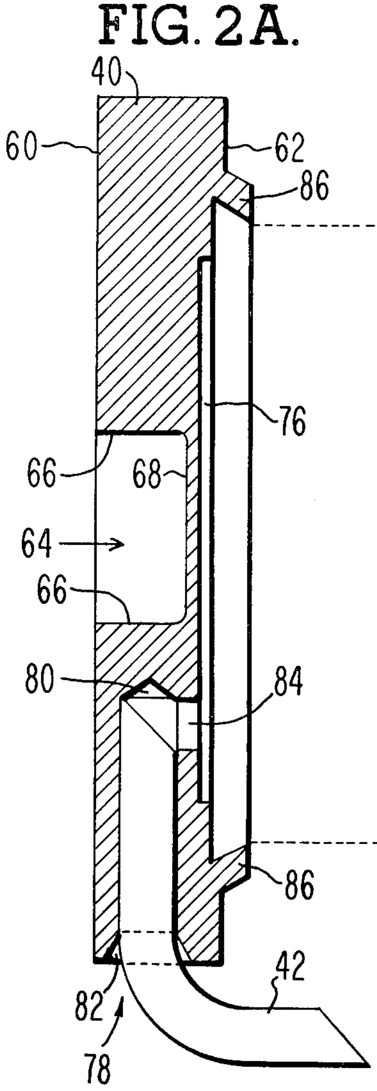
FIG. 2A is a sectional side view of the components of the ink jet droplet generator of FIG. 1 showing them in aligned relation.

Referring now to FIG. 2A, the droplet generator body 40, diaphragm 38, and crystal 36 are shown in greater detail prior to assembly. The discussion of each component will include exemplary dimensions from a practical embodiment.

The piezoelectric crystal 36 is in the form of a thin, cylindrical wafer having an electrically conductive coating, preferably silver, on each of its opposed faces. The crystal 36 is selected to be axially polarized, such that when it is exposed to an electric field in the direction of polarization, there is an axial expansion and a radial contraction of the crystal. The voltage potential applied by contact A in FIG. 1 will result in an electric field in the direction desired. The crystal 36 may be 0.009 in. thick with a 0.300 in. diameter.

The diaphragm 38 is preferably a stainless steel disk 0.008 in. thick with a 0.400 in. diameter. The piezoelectric crystal 36 is bonded concentrically to the diaphragm 38 with a conductive epoxy or adhesive of similar property to from a unitary, laminated assembly. When the piezoelectric crystal 36 is actuated by an electric field, its axial expansion and radial contraction will cause a corresponding inward flexing of the diaphragm 38.

The droplet generator body 40 is preferably formed of an integral stainless steel disk having a front face 60 and a rear face 62. The generator body 40 may have a thickness of 0.080 in. with a diameter of 0.560 in. A central cavity 64 of substantially the majority of the depth of the body 40 is formed in the front face 60. The cavity 64 has a substantially cylindrical configuration defining side walls 66 and a bottom wall 68. The central cavity 64 may have a depth of 0.072 in. with a diameter of 0.120 in.

Figure 3A:
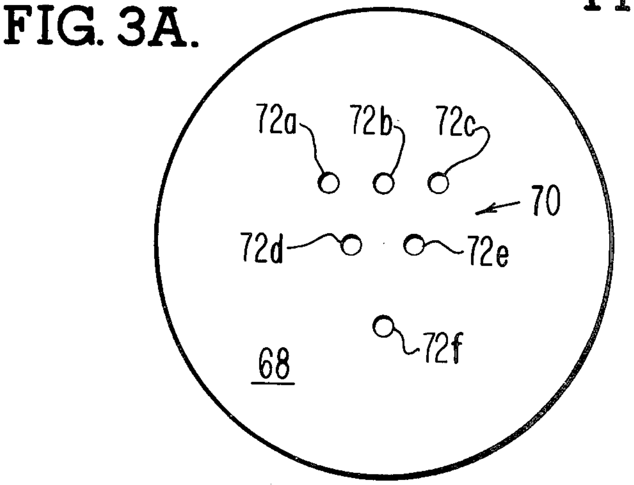
FIG. 3A is an enlarged front view of the nozzle of the droplet generator body of FIGS. 2A and B with apertures arranged to form an elemental dot.

FIG. 3A is an enlarged representation of the bottom wall 68. It has formed within it a nozzle, generally at 70, defined by a triangular array of apertures 72*a*, *b*, *c*, *d*, *e*, and *f*. It has been determined from empirical observation that a triangular array of relatively small apertures creates a collective ink dot of consistent shape and clarity. Each apertures 72 may have a diameter of 0.004 in. and is preferably formed by an electro-drill operation. The apertures are not shown in FIG. 2A or B because of their small size relative to the dimension of the central opening 64.

Figure 3B:
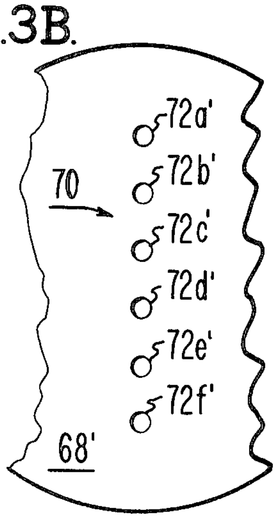
FIG. 3B is an alternative arrangement of the nozzle apertures of the FIG. 3A.

Alternatively, the nozzle 70 may assume the configuration shown in FIG. 3B, wherein the apertures 72*a'*, *b'*, *c'*, *d'*, *e'* and *f'* are in column-like formation. This configuration defines a bar code element and may be used for bar encoding.

Viewing again FIG. 2A, the tubing 42 is received within an ink port, generally at 78, formed in the side wall of the droplet generator body 40. The ink port 78 includes a pilot hole 80 having a chamfered opening 82. The pilot hole 80 is dimensioned to closely receive the tubing 42 to achieve a press fit therein. At the inner extreme of the pilot hole 80 is a connecting bore 84 formed at a right angle to the pilot hole.

The droplet generator body 40 has formed in its rear face 62 a central recess of substantially uniform depth defining a capillary chamber 76. The capillary chamber 76 may have a depth of 0.003 in. with a diameter of 0.350 in.

Also formed on the rear face 62 is an integral, circumferential flange 86 shown in its undeformed condition. The flange 86 is dimensioned to receive the unitary assembly of the piezoelectric crystal 36 and diaphragm 38. It may have a height of 0.020 in. and project at an angle of approximately 60° with respect to the rear face 62.

Figure 2B:
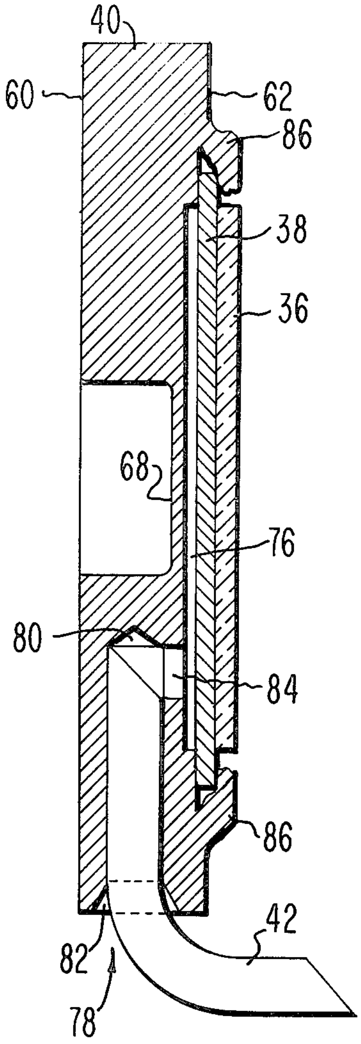
FIG. 2B is an assembled sectional view of the components of FIG. 2A.

FIG. 2B illustrates the droplet generator body 40 in assembled relation with the unitary assembly of the piezoelectric crystal 36 and diaphragm 38. When the unitary assembly is placed within the flange 86, it provides a closure or boundary surface for one side of the capillary chamber 76. The unitary assembly is secured in this position by deforming the flange under the influence of a normal force, which may be for example the well-known spin-over method, to cause it to bear against the diaphragm 38.

When the capillary chamber 76 is closed off by the diaphragm 38, it can receive and store ink through the port 78 under capillary action. Further, the volume within the capillary chamber 76 is subjected to perturbations from a flexing of the bonded diaphragm 38 and crystal 36 upon the application of an electrical stimulus to the crystal in the manner hereinbefore described.

Figure 4A:
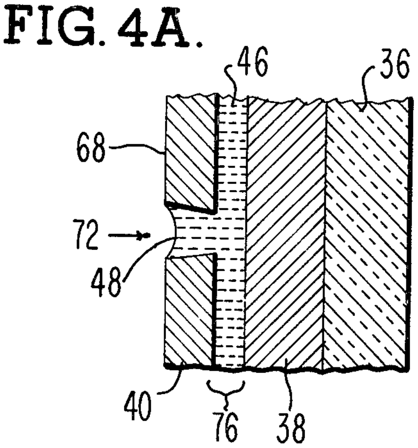
FIGS. 4A, B and C are enlarged sectional views of an aperture in the nozzle showing the equilibrium, droplet emission and equilibrium restoration conditions, respectively, in each droplet formation cycle.
Figure 4B:
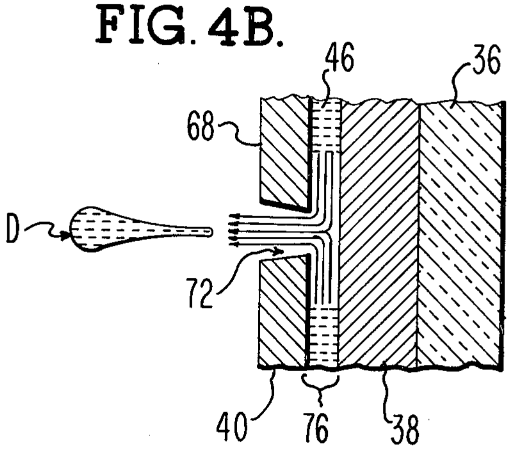
Figure 4C:
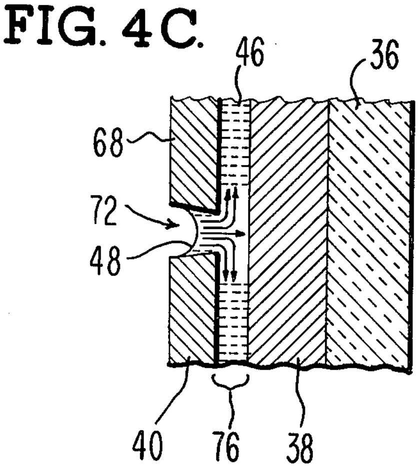

The operation of the invention is best understood in conjunction with FIGS. 4A, 4B and 4C, each of which is an enlarged representation of a cross sectional area in the vicinity of a single nozzle aperture 72.

FIG. 4A shows the droplet generator in its equilibrium state. The unitary assembly of the diaphragm 38 and piezoelectric crystal 36 form a closure for one surface of the capillary chamber 76. The opposed wall of the capillary chamber 76 is defined by a portion of the generator body 40. The nozzle aperture 72 has a slight, but negligible inward taper from wall 68 as a consequence of the electro-drill operation.

In the equilibrium state, ink 46 is held within the capillary chamber 76 under capillary action. Also, capillary action creates a surface tension boundary at the mouth of the nozzle aperture 72 in the form of a concave meniscus.

FIG. 4B is a schematic representation of the fluid dynamics which occur upon the application of an electrical stimulus to the piezoelectrica crystal 36. The stimulus causes the bonded assembly of the crystal 36 and diaphragm 38 to extend axially inward, causing a sudden decrease in the volume of the capillary chamber 76 and a corresponding increase in the fluid pressure. This sudden purturbation causes an ink mass to accelerate toward the nozzle aperture 72. The mass flux causes the concave meniscus to become convex in order to cope with the rising pressure until it finally passes a threshold where the surface tension can no longer contain the fluid and the meniscus dynamically transforms into a liquid needle issuing from the nozzle aperture 72. The liquid needle then breaks away and forms a droplet D.

FIG. 4C is a schematic representation of the fluid dynamics which occur when the droplet producing stimulation is removed. When the piezoelectric crystal 36 is no longer excited, the bonded assembly of the diaphragm 38 and crystal 36 flexes outwardly toward its relaxed or unstressed condition. This outward flexure causes a relative increase in the volume of the capillary chamber 76 and a corresponding decrease in fluid pressure. This causes the meniscus to assume a concave shape and be drawn inwardly toward the capillary chamber. The ink mass within the capillary chamber is restored when the sudden reduction of fluid pressure causes ink to flow through the port 72 under capillary action. The influx of new ink normalizes the pressure and the meniscus will tend to return toward its equilibrium position as shown in FIG. 4A.

It will be recalled in relation to the discussion of FIG. 1, that a resilient, damping material forms a barrier behind the rear face of crystal 36 to prevent undesirable secondary oscillations that may cause secondary droplet generation. The provision of this resilient, damping material such as room temperature vulcanizing silicon, will provide for relatively quick restoration of the capillary chamber 76 volume and pressure to the equilibrium condition shown in FIG. 4A. The preceeding detailed description of a specific embodiment is but one adaptation of the present invention in an ink jet droplet generator of simplified design with superior performance characteristics. The invention is adaptable to a range of embodiments which will suggest themselves to those skilled in the art without departing from the scope and essence of the appended claims.

The embodiments of the invention in which an exclusive property or privilege is claimed are defined as follows:

1. An ink jet droplet generator comprising:

a generator body having a front face and a rear face, the rear face having formed within it a central recess of substantially uniform depth to define a capillary chamber;

a nozzle defined by a plurality of continuous aperatures communicating the front face and the capillary chamber of the generator body;

feed means, in fluid communication with the capillary chamber, for feeding ink to the capillary chamber from an ink source; and a single planar flexure means, mounted on the rear face of the generator body in closed relation to the capillary chamber and having a distance from the nozzle to permit capillary action within the capillary chamber, for flexurally responding to an external excitation to create a pressure perturbation in the capillary chamber to force the flow of ink from the capillary chamber through the nozzle for droplet generation, a single ink dot being created on demand in response to a single flexural response.

2. The ink jet droplet generator of claim 1, further having a central cavity formed in the front face of the generator body, the central cavity having side walls and a bottom wall and wherein the one or more continuous apertures communicate the bottom wall and capillary chamber.

3. The ink jet printer of claim 1, wherein the nozzle comprises a group of six continuous apertures spaced to form a triangular array.

4. The ink jet printer of claim 1, wherein the nozzle comprises a plurality of apertures aligned in column-like formation to define a bar code element.

5. The ink jet droplet generator of claim 1, wherein the planar flexture means and the generator body are each formed of electrically conductive material, and further comprising; a first electrical terminal contacting the planar flexure means and a second electrical terminal contacting the generator body, each terminal adapted to communicate with the opposite poles of a source of electrical energy to provide the external excitation to the planar flexure means.

6. The ink jet droplet generator of claim 1, wherein the feed means is defined to include a port formed in the generator body.

7. The ink jet droplet generator of claim 1, further comprising damping means for damping out oscillatory flexing of the planar flexure means to prevent multiple generation of ink droplets from a single excitation.

8. The ink jet droplet generator of claim 7, wherein the damping means comprises a silicon surface disposed between the rear face of the generator body and the planar flexure means, and in contact with the planar flexure means.

9. The ink jet droplet generator of claim 1, wherein said planar flexure means comprises, electromechanical transducer means, responsive to an electrical signal representing the external excitation, for mechanically deforming, and diaphragm means, disposed in closed relation over the capillary chamber and responsive to deformations in the transducer means, for flexing to create a pressure perturbation in the capillary chamber.

10. The ink jet droplet generator of claim 9, wherein the electromechanical transducer means comprises a piezoelectric crystal.

11. The ink jet droplet generator of claim 10, wherein the diaphragm means comprises a flexural disk bonded to the piezoelectric crystal.

12. The ink jet droplet generator of claim 11, wherein the bonded diaphragm and piezoelectric crystal are held in closed relation to the capillary chamber by a deformable flange bounding the capillary chamber and formed integrally with the generator body, the flange receiving the diaphragm in its undeformed state and securing it in closed relation to the capillary chamber upon deformation.

13. An ink jet droplet generator comprising:

a housing;

a generator body disposed within the housing and having a front face and a rear face, the rear face having formed within it a central recess of substantially uniform depth to define a capillary chamber;

a nozzle defined by a plurality of apertures communicating the front face and the capillary chamber of the generator body;

feed means, in fluid communication with the capillary chamber, for feeding ink to the capillary chamber from an ink source;

a single planar flexure means, mounted on the rear face of the generator body in closed relation to the capillary chamber and having a distance from the nozzle to permit capillary action within the capillary chamber, for flexurally responding to an external excitation to create a pressure perturbation in the capillary chamber to force the flow of ink from the capillary chamber through the nozzle for droplet generation, a single ink dot being created on demand in response to a single flexural response; and damping means, contained within the housing and disposed between the rear face of the generator body and the planar flexure means, and in contact with the planar flexure means, for damping out oscillatory flexing of the planar flexure means to prevent multiple generation of ink droplets from a single excitation.

* * * * *